(12) United States Patent
Ben-Ezer

(10) Patent No.: US 10,823,669 B2
(45) Date of Patent: Nov. 3, 2020

(54) INSPECTING AN OBJECT THAT INCLUDES A PHOTO-SENSITIVE POLYIMIDE LAYER

(71) Applicant: CAMTEK LTD., Migdal Haemek (IL)

(72) Inventor: Zehava Ben-Ezer, Moshav Balfuria (IL)

(73) Assignee: CAMTEK LTD., Migdal-Haemek (IL)

( * ) Notice: Subject to any disclaimer, the term of this patent is extended or adjusted under 35 U.S.C. 154(b) by 0 days.

(21) Appl. No.: 16/266,120

(22) Filed: Feb. 4, 2019

(65) Prior Publication Data

US 2019/0242812 A1    Aug. 8, 2019

Related U.S. Application Data

(60) Provisional application No. 62/626,174, filed on Feb. 5, 2018.

(51) Int. Cl.
| | | |
|---|---|---|
| *G01N 21/33* | (2006.01) | |
| *G01N 21/95* | (2006.01) | |
| *C08L 79/08* | (2006.01) | |
| *G01N 21/88* | (2006.01) | |
| *G01N 21/956* | (2006.01) | |
| *G01B 11/02* | (2006.01) | |
| *G01N 21/17* | (2006.01) | |
| *G01N 21/84* | (2006.01) | |
| *G01N 21/77* | (2006.01) | |

(52) U.S. Cl.
CPC ............ *G01N 21/33* (2013.01); *C08L 79/08* (2013.01); *G01B 11/02* (2013.01); *G01N 21/8806* (2013.01); *G01N 21/9501* (2013.01); *G01N 21/956* (2013.01); *G01N 21/95684* (2013.01); *G01N 2021/1736* (2013.01); *G01N 2021/1765* (2013.01); *G01N 2021/7773* (2013.01); *G01N 2021/8416* (2013.01); *G01N 2021/8845* (2013.01); *G01N 2201/0484* (2013.01); *G01N 2201/0873* (2013.01)

(58) Field of Classification Search
CPC .............. G01N 21/33; G01N 21/8806; G01N 21/9501; G01N 21/956; G01N 21/95684; G01N 2021/1736; G01N 2021/1765; G01N 2021/7773; G01N 2021/8416; C08L 79/08; G01B 11/02
USPC ......................................................... 356/443
See application file for complete search history.

(56) References Cited

U.S. PATENT DOCUMENTS

| | | | | |
|---|---|---|---|---|
| 5,798,837 A | * | 8/1998 | Aspnes ............... | G01B 11/0641 356/369 |
| 6,094,275 A | * | 7/2000 | Lin ........................ | G01N 21/55 356/400 |
| 6,479,900 B1 | * | 11/2002 | Shinogi ............... | H01L 23/3114 257/738 |

(Continued)

*Primary Examiner* — Roy M Punnoose
(74) *Attorney, Agent, or Firm* — Reches Patent

(57) ABSTRACT

A method for determining a property of an object positioned on a photo-sensitive polyimide layer, wherein the photo-sensitive polyimide layer is positioned on a lower layer that is a radiation reflecting layer, the method may include illuminating, by an illumination unit, an area of the photo-sensitive polyimide layer with first ultraviolet radiation; sensing, by a first sensor, a first reflected ultraviolet radiation that was reflected from the area; and determining, by a processor, based at least in part on the first reflected ultraviolet radiation, the property of the object.

16 Claims, 11 Drawing Sheets

(56) References Cited

U.S. PATENT DOCUMENTS

| | | | |
|---|---|---|---|
| 7,027,158 B2* | 4/2006 | Hendrix | G01B 11/0625 |
| | | | 356/369 |
| 9,518,916 B1* | 12/2016 | Pandev | G01N 21/255 |
| 2005/0254050 A1* | 11/2005 | Fielden | G01J 3/10 |
| | | | 356/369 |
| 2008/0251916 A1* | 10/2008 | Cheng | H01L 24/13 |
| | | | 257/738 |
| 2010/0001408 A1* | 1/2010 | Higuchi | H01L 24/11 |
| | | | 257/774 |
| 2018/0120151 A1* | 5/2018 | Feldman | G01J 1/0219 |

* cited by examiner

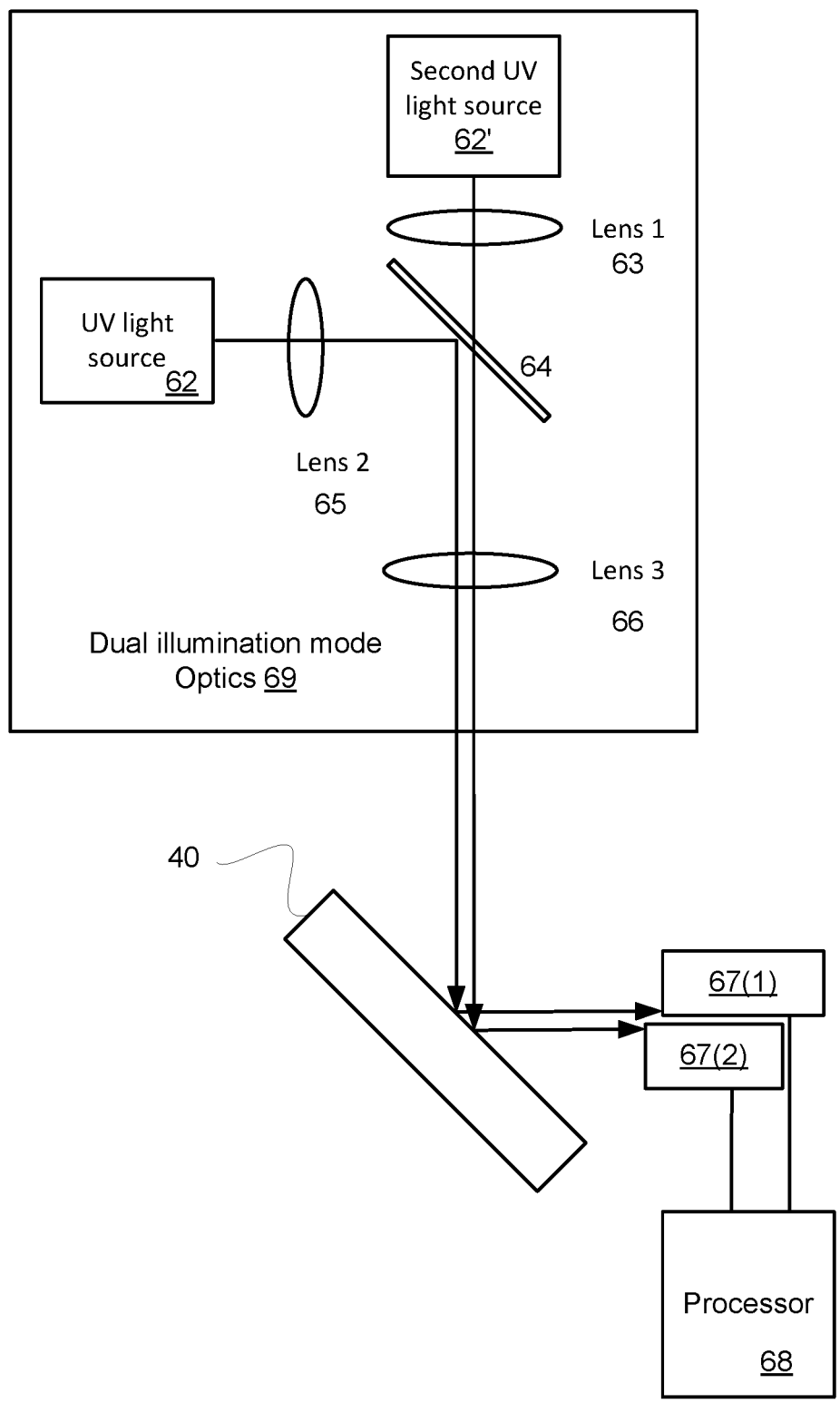

INSPECTING AN OBJECT THAT INCLUDES A PHOTO-SENSITIVE POLYIMIDE LAYER

CROSS-REFERENCE

This application claims priority from U.S. provisional patent Ser. No. 62/626,174 filing date Feb. 5 2018.

BACKGROUND

There is an increase in the applications where Photo-Sensitive Polyimide (PSPI) layer is is positioned above a radiation reflecting layer of a wafer. The radiation reflecting layer may be a silicon layer or another layer.

For three dimensional (3D) metrology of objects such as bumps height inspection and metrology, this PSPI layer imposes new challenges to automatic optical inspection (AOI) methods due to the double reflections from the wafer—as illustrated in FIG. 1.

FIG. 1 illustrates a bump 41 positioned on a wafer 40 that includes a PSPI layer 42 that is located above a lower layer 43 that is a radiation reflecting layer.

The height of the bump is the difference between the height value of the top of the bump and the height value of the bottom of the bump. The height value of the bottom of the bump is the height value of the upper surface of the PSPI layer.

The height value of the top of the bump may be determined by illuminating (by illumination unit 20) the top of the bump with radiation 21 and collecting (by image sensor 10) radiation 31 reflected from the the top of the bump.

When illuminating the PSPI layer by radiation 22 the image sensor receives (a) a first reflected radiation 32 from the upper surface of the PSPI layer and (b) a second reflected radiation 33. The second reflected radiation 33 is reflected from the bottom layer 43.

The first reflected radiation 23 results from a reflection of a first part of radiation 22 from the upper surface of the PSPI layer.

A second part of radiation 22 passes through the PSPI layer 42, reaches the lower layer 32, is reflected by the lower layer 43, passes (again) through the PSPI layer and reaches the image sensor.

The second reflected radiation 33 introduces a height error. This prevents a determination of the bump height in a reliable and an accurate manner.

This issue becomes more important and demands solution as the semiconductor industry in the wafer level chip packaging segment moves towards lower profile bumps of 2-3 microns.

SUMMARY

There may be provide a non-transitory computer readable medium that may store instructions for illuminating, by an illumination unit, an area of a photo-sensitive polyimide layer with first ultraviolet radiation; wherein an object may be positioned on the photo-sensitive polyimide layer, wherein the photo-sensitive polyimide layer may be positioned on a lower layer that may be a radiation reflecting layer; sensing, by a first sensor, a first reflected ultraviolet radiation that was reflected from the area; and determining, by a processor, based at least in part on the first reflected ultraviolet radiation, the property of the object.

There may be provided an automatic optical inspection system that may include a first illumination unit, a first sensor and a processor; wherein the illumination unit may be configured to illuminate an area of a photo-sensitive polyimide layer with first ultraviolet radiation; wherein an object may be positioned on the photo-sensitive polyimide layer; wherein the photo-sensitive polyimide layer may be positioned on a lower layer that may be a radiation reflecting layer; wherein the first sensor may be configured to sense a first reflected ultraviolet radiation that was reflected from the area; and wherein the processor may be configured to determine, based at least in part on the first reflected ultraviolet radiation, a property of the object.

There may be provided a method for determining a property of an object positioned on a photo-sensitive polyimide layer, wherein the photo-sensitive polyimide layer may be positioned on a lower layer that may be a radiation reflecting layer. The method may include illuminating, by an illumination unit, an area of the photo-sensitive polyimide layer with first ultraviolet radiation; sensing, by a first sensor, a first reflected ultraviolet radiation that was reflected from the area; and determining, by a processor, based at least in part on the first reflected ultraviolet radiation, the property of the object.

The method may include illuminating the object with second radiation; sensing second reflected radiation that may be reflected from a part of the object that differs from a bottom of the object; and wherein the determining of the property of the object may be also based at least in part on the second reflected radiation.

The second reflected radiation may be reflected from a top of the object, and wherein the property of the object may be a height of the object.

The second radiation may be a visible light radiation.

The second radiation may be an ultraviolet radiation.

The wavelength of the first ultraviolet radiation may be below four hundred nanometers.

The method may include determining whether to illuminate the area with the first ultraviolet radiation; and illuminating the area with the first ultraviolet radiation only when determining to illuminate the area with the first ultraviolet radiation.

The determining may be preceded by illuminating the area with third radiation that differs from the first ultraviolet radiation; collecting third reflected radiation from the area; and wherein the determining of whether to illuminate the area with the first ultraviolet radiation may be based, at least in part, on the third reflected radiation.

The method may include determining to illuminate the area with the first ultraviolet radiation when the third reflected radiation exhibits an ambiguity.

The third radiation may be a visible light radiation.

The illuminating of the area with first ultraviolet radiation may include emitting the first ultraviolet radiation by a ultraviolet source; collecting the first ultraviolet radiation by an optical collector that may be optically coupled to at least one optical fiber; conveying the first ultraviolet radiation over the at least one optical fiber and towards at least one optical element; and directing the first ultraviolet radiation onto the area by the at least one optical element.

The optical collector may be a radially symmetrical and has a concave shape.

The optical collector may be hollow.

The optical collector may be a bulk of transparent coated with a reflective element.

The at least one optical fiber may be a fiber bundle.

The at least one optical fiber may include a liquid core.

The first illumination unit may be configured to illuminate the object with second radiation; the first sensor may be configured to sense second reflected radiation that may be reflected from a part of the object that differs from a bottom of the object; and the processor may be configured to determine the property of the object also in response to the second reflected radiation.

The automatic optical inspection system may include a second illumination unit and a second sensor; the second illumination unit may be configured to illuminate the object with second radiation; the second sensor may be configured to sense second reflected radiation that may be reflected from a part of the object that differs from a bottom of the object; and wherein the processor may be configured to determine the property of the object also in response to the second reflected radiation.

BRIEF DESCRIPTION OF THE INVENTION

The present invention will be understood and appreciated more fully from the following detailed description taken in conjunction with the drawings in which:

FIGS. 9-11 illustrate examples of systems.

DETAILED DESCRIPTION OF THE INVENTION

Figure 1:
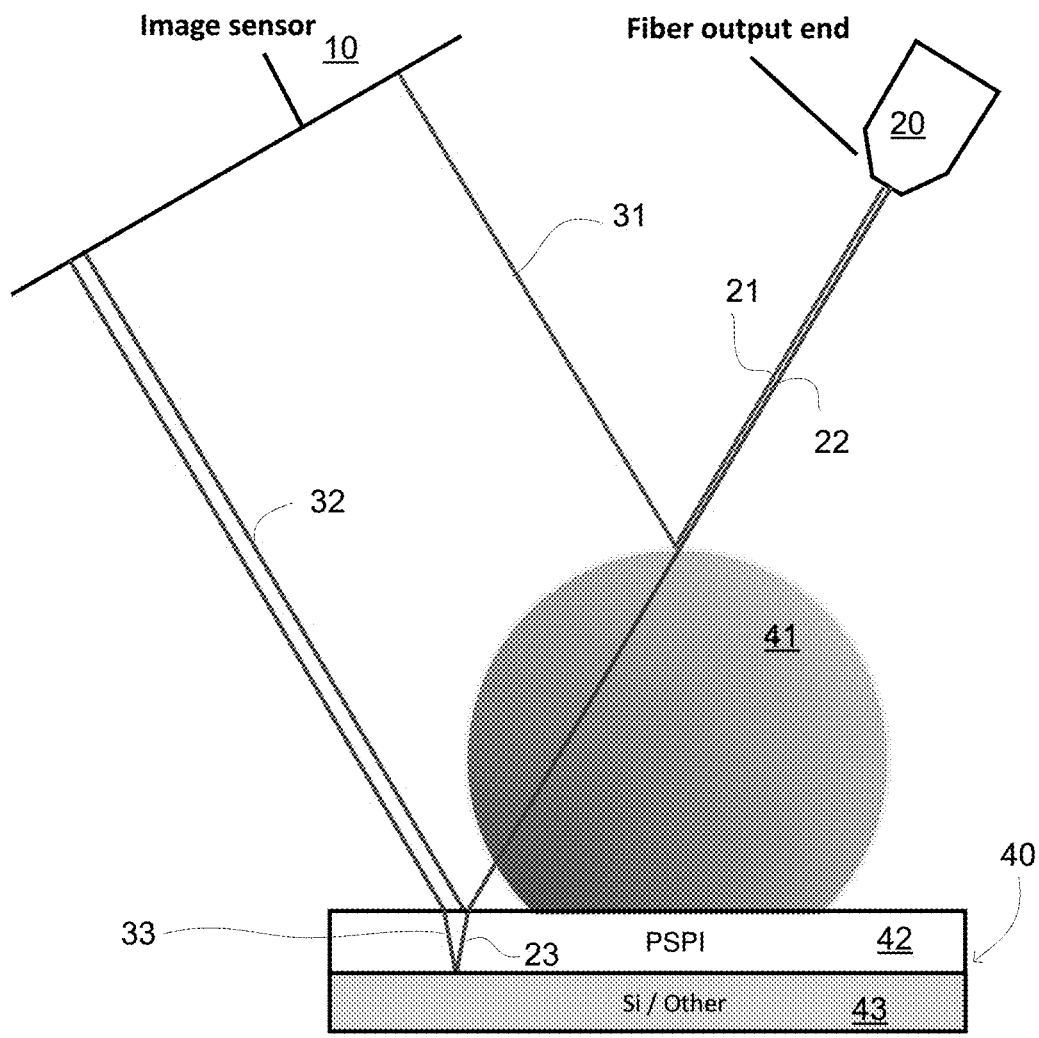
FIG. 1 illustrates a prior art reflection from PSPI layer.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer program product that stores instructions that once executed by a computer result in the execution of the method. The non-transitory computer program product may be a chip, a memory unit, a disk, a compact disk, a non-volatile memory, a volatile memory, a magnetic memory, a memristor, an optical storage unit, and the like.

Any reference in the specification to a system should be applied mutatis mutandis to a method that can be executed by the system and should be applied mutatis mutandis to a non-transitory computer program product that stores instructions that once executed by a computer result in the execution of the method.

Any reference in the specification to a non-transitory computer program product should be applied mutatis mutandis to a method that can be executed when applying the instructions stored in the non-transitory computer program product and should be applied mutatis mutandis to a system capable of executing the instructions stored in the non-transitory computer program product.

The term "comprising" is synonymous with (means the same thing as) "including," "containing" or "having" and is inclusive or open-ended and does not exclude additional, unrecited elements or method steps.

The term "consisting" is a closed (only includes exactly what is stated) and excludes any additional, unrecited elements or method steps.

The term "consisting essentially of" limits the scope to specified materials or steps and those that do not materially affect the basic and novel characteristics.

In the claims and specification any reference to the term "comprising" (or "including" or "containing") should be applied mutatis mutandis to the term "consisting" and should be applied mutatis mutandis to the phrase "consisting essentially of".

In the claims and specification any reference to the term "consisting" should be applied mutatis mutandis to the term "comprising" and should be applied mutatis mutandis to the phrase "consisting essentially of".

In the claims and specification any reference to the phrase "consisting essentially of" should be applied mutatis mutandis to the term "comprising" and should be applied mutatis mutandis to the term "consisting".

In the following specification, the invention will be described with reference to specific examples of embodiments of the invention. It will, however, be evident that various modifications and changes may be made therein without departing from the broader spirit and scope of the invention as set forth in the appended claims.

There is provided a system and method that use ultraviolet light at specific wavelength to enable high resolution and high accuracy measurement of objects height above the reference surface even when the object has a PSPI layer.

Increased accuracy of the height measurement may be obtained by using ultraviolet light, thereby eliminating the second reflection from the internal Silicon surface, for applications of an object 3D metrology on top of a PSPI layer.

Furthermore, while inspection of low profile bumps with white light limits the ability to differentiate and detect low profile objects due to its wide wavelength spectrum (of the white light)—using the narrow band ultraviolet light source, offers short wavelength radiation and provides higher height measurement resolution.

The ultraviolet light beam generated by the ultraviolet light source can be of significant energy in order to allow adequate SNR and/or adequate number of received photons.

There may be provided a system (see, for example FIG. 3) for 3D metrology of semiconductor wafers. The system may incorporate optical measurement. The system 60 includes ultraviolet illumination source (denoted ultraviolet light source 62) that is used for performing the optical measurement. (The optical measurement can be any: interferometry, WLI-UV, achromatic confocal in ultraviolet range, triangulation in UV, etc.).

Figure 3:
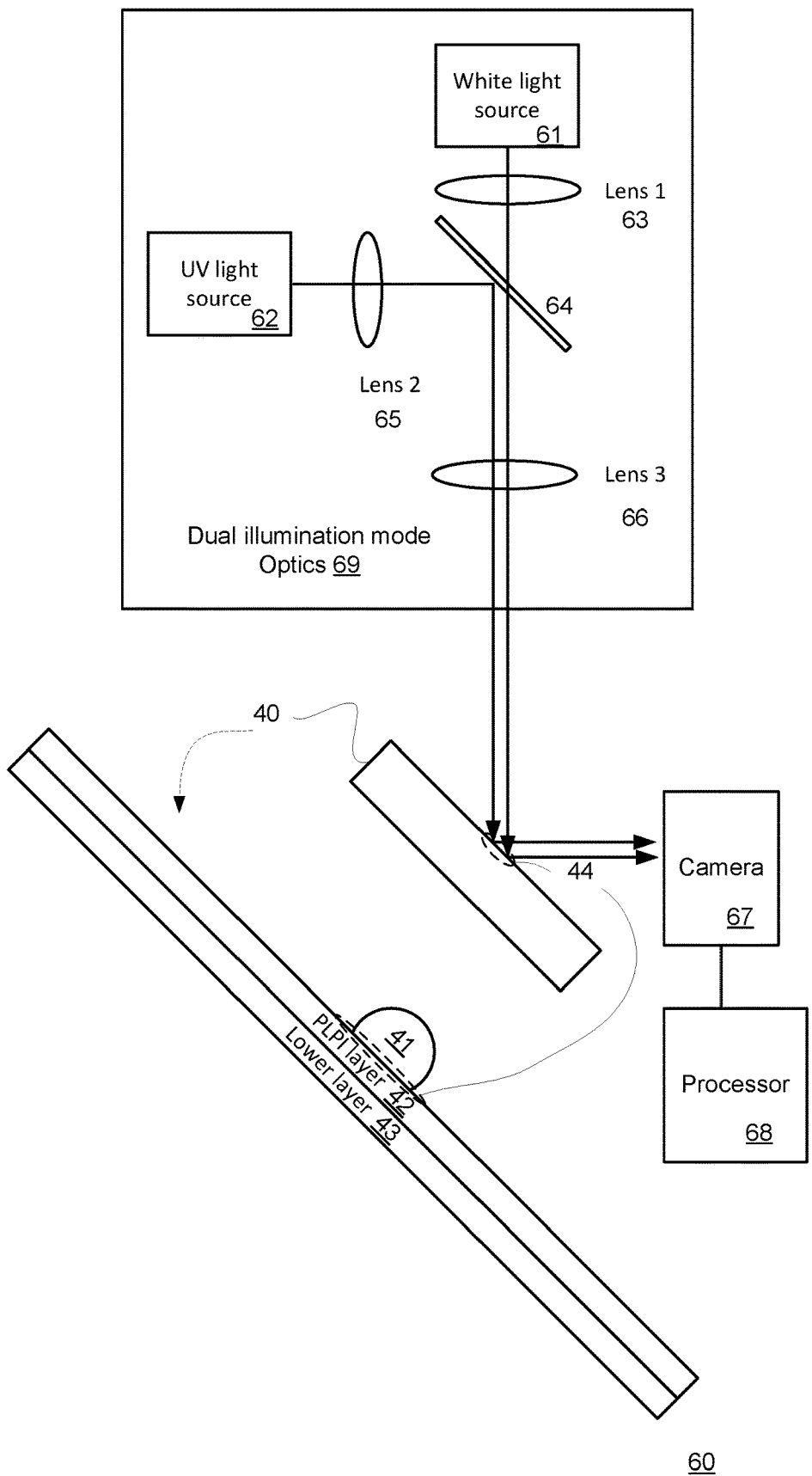
FIG. 3 illustrates a system according to an embodiment of the invention.

FIG. 3 illustrates a dual illumination mode optics 69 that includes a white light source 61, ultraviolet light source 62, first lens (lens 1) 63, second lens (lens 2) 65, beam splitter 64, third lens (lens 3) 66, camera 67 and processor 68.

White light from white light source 61 passes through first lens 63, through beam splitter 64, through third lens 66 and onto the object 40. Reflected white light from an object such as but not limited to bump 41 is sensed by camera 67 and detection signals from camera 67 are sensed by processor 68.

UV from ultraviolet source 62 passes through second lens 65, are reflected by beam splitter 64, pass through third lens 66 and onto the object 40. Reflected ultraviolet from object such as but not limited to bump 41 is sensed by camera 67 and detection signals from camera 67 are sensed by processor 68.

Figure 10:
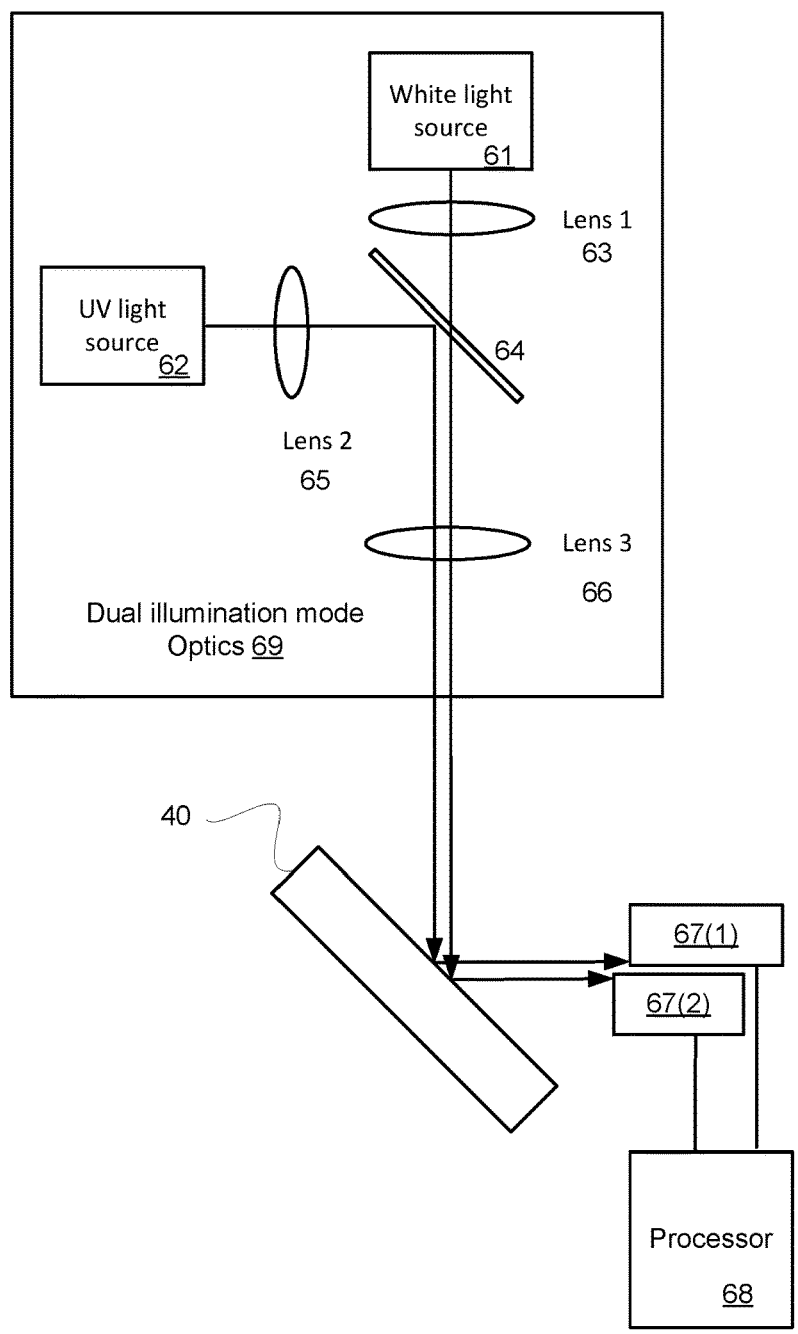

It should be noted that the camera may be replaced by multiple sensors (see, for example sensors 67(1) and 67(2) of FIG. 10) —such as ultraviolet sensor and white light sensor —although using a single sensor for both wavelengths may be cheaper and simpler.

It is also noted that the lenses, and the beam splitter is merely a non-limiting example of optical components of the AOI.

There may be provided a system for 3D metrology of semiconductor wafers. The system incorporates optical measurement. The system includes ultraviolet illumination source and visual light (VIS) illumination source that are used alternately to perform the optical measurement. (The optical measurement can be any: interferometry, WLI-UV, achromatic confocal in ultraviolet range, triangulation in UV, etc.).

Figure 2:
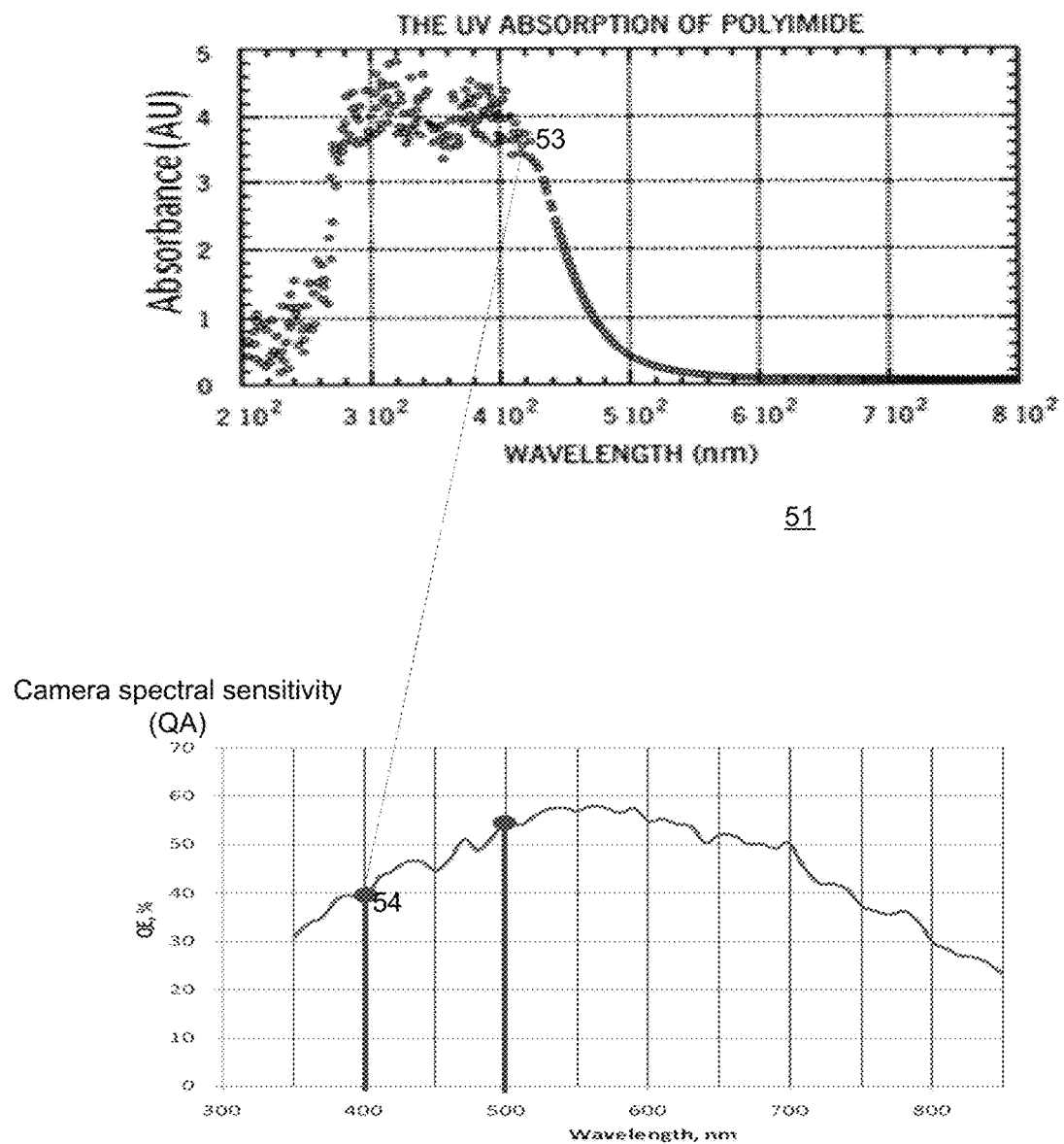
FIG. 2 illustrates a selection of a ultraviolet light in response to PSPI behavior and camera sensitivity according to an embodiment of the invention.

The narrowband ultraviolet light can be selected as a tradeoff between the sensitivity of an image sensor used to sense radiation from the object and the absorbance of radiation by the Photo-Sensitive Polyimide (see, for example, FIG. 2—graph 51 illustrates the absorbance of the ultraviolet radiation by the PSPI layer as a function of the wavelength of the ultraviolet radiation—and graph 52 illustrates the spectral sensitivity of the camera to the reflected radiation). The absorption of the ultraviolet radiation should be high in order to substantially attenuate the ultraviolet radiation that propagates through the PSPI layer (thus attenuating the ultraviolet radiation from reaching the lower layer—and attenuating the reflected ultraviolet radiation from the lower layer). Graph 51 illustrates a substantial degradation in the attenuation following 400 nanometer (see point 53). Graph 52 illustrates the sensitivity of the camera that has a peak at about 550 nanometers but decreases at both sides (a decreased sensitivity is reached at about 400 nanometers)—and is very low below 350 nanometers.

It can be, for example, about 395 nm, about 405-410 nm and the like. It is narrowband in the sense that its bandwidth is few nanometers (for example –10 nm).

It has been found that the ultraviolet illumination source can include light emitting diodes or include other ultraviolet sources that do not include LEDs (Mercury lamps followed by appropriate filters).

In order to increase the SNR (number of detected photons) the coupling between the ultraviolet source to the fiber in which the ultraviolet light propagates (see FIG. 4) may be improved.

Figure 4:
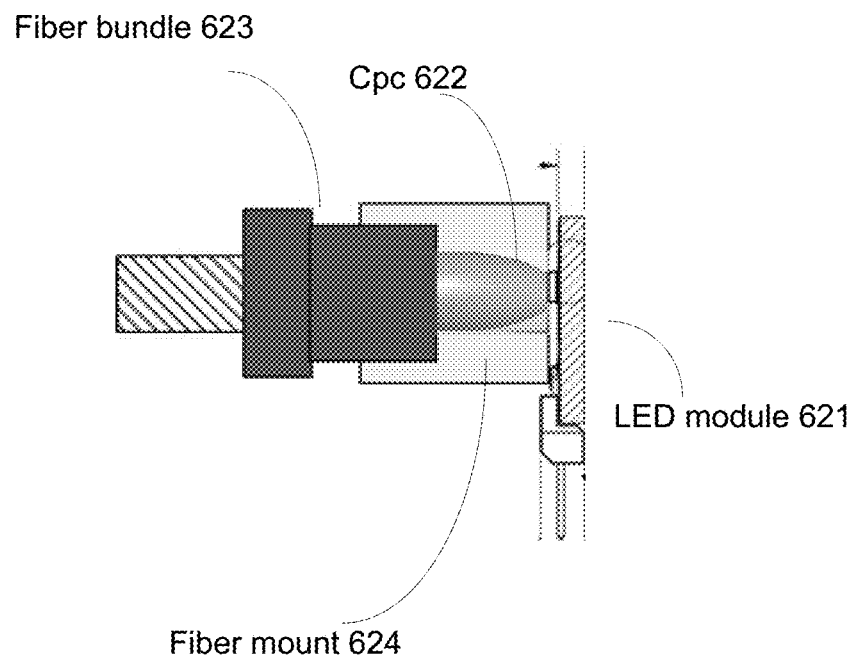
FIG. 4 illustrates a portion of the system according to an embodiment of the invention.

FIG. 4 illustrates a LED module 621 that is a source of ultraviolet radiation. An optical collector (denoted CPC 622) for collecting the ultraviolet radiation (all or at least a majority or at least a substantial amount of) from the LED module 621, and providing the collected ultraviolet radiation to one or more fibers such as fiber bundle 623 and/or a liquid fiber guide (that has a liquid core).

A fiber mount 624 supports and maintains the connection between CPC 622 and the fiber bundle 623.

In order to improve the coupling and ultraviolet radiation collection there is provided a reflective coupling element such as a CPC (internal surface could be glass light guide, reflective metal or diffusive spectral). The CPU optically couples the LED module to the fiber. The CPC may have an anti-reflective coating on input and output surfaces.

The optics AR coating on in & out planes.
The light guide may be a liquid light guide.

Figure 5:
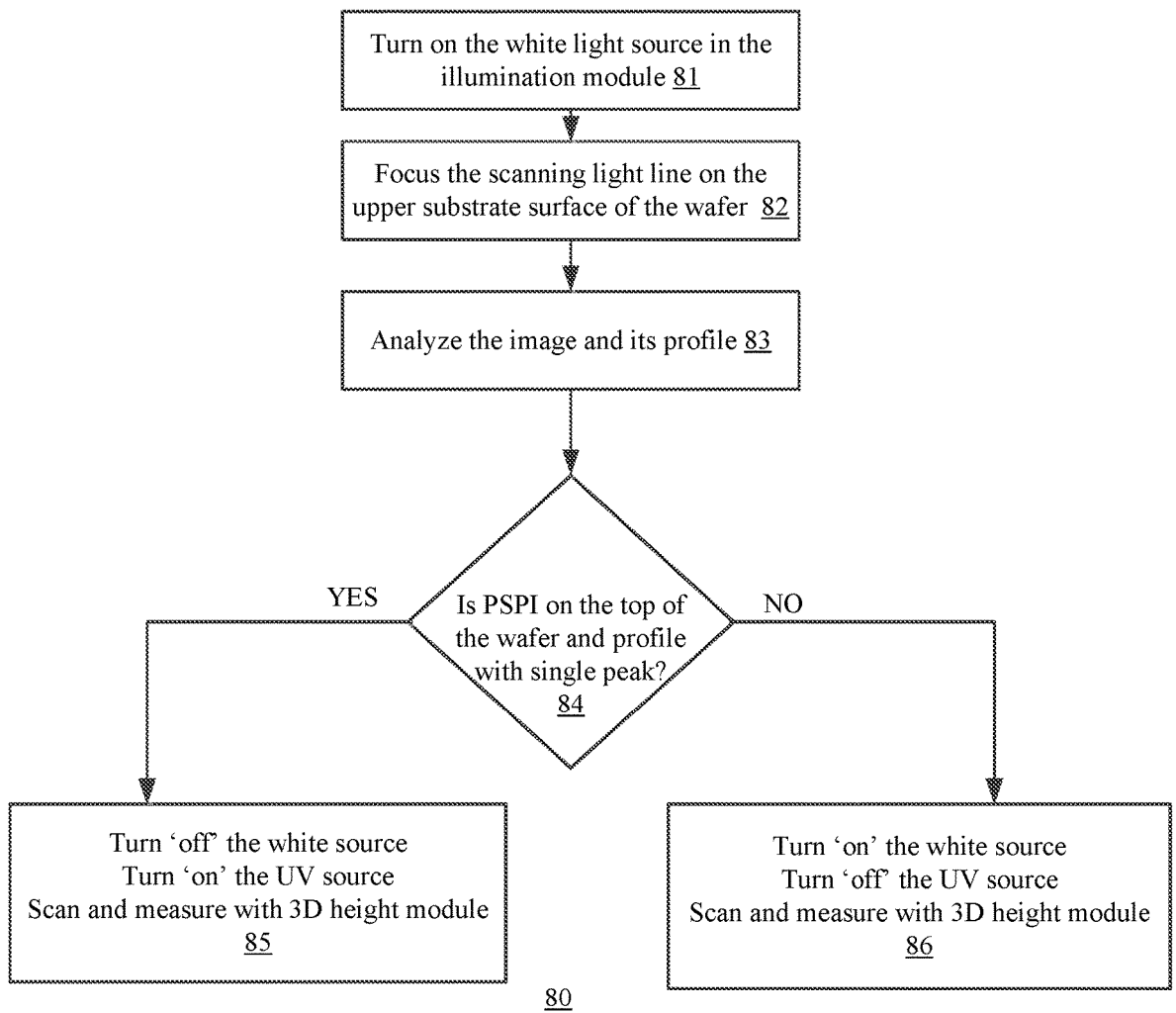
FIG. 5 illustrates a method for dual mode operation according to an embodiment of the invention.

The system may operate in a dual mode—light or ultraviolet illumination—in response to the presence (or lack of) PSPI layer—as illustrated in FIG. 5.

Method 80 of FIG. 5 includes the following steps:

Step 81 of activating a light source in an illumination module.

Step 82 (following step 81) of focusing a scanning light line on the upper substrate surface of the wafer. The focusing may be followed by collecting light from the upper substrate surface of the wafer and even generating an image of the illuminated upper surface substrate of the wafer.

Step 83 of analyze the image and its profile.

Step 84 if checking if ultraviolet illumination is required—checking if no PSPI on the top of the wafer and profile with single peak. The single peak is obtained when only one reflection of the line is detected. Multiple peaks (for example two peaks) are collected when there are multiple reflections—such as the dual reflections of FIG. 1.

If no ultraviolet illumination is required jumping to step 86 of turning 'on' the white light source, turn 'off' the ultraviolet source, and scan and measure with 3D height module.

If ultraviolet illumination is required jumping to step 85 of turning 'off' the white light source, turn 'on' the ultraviolet source, and scan and measure with 3D height module.

Figure 6:
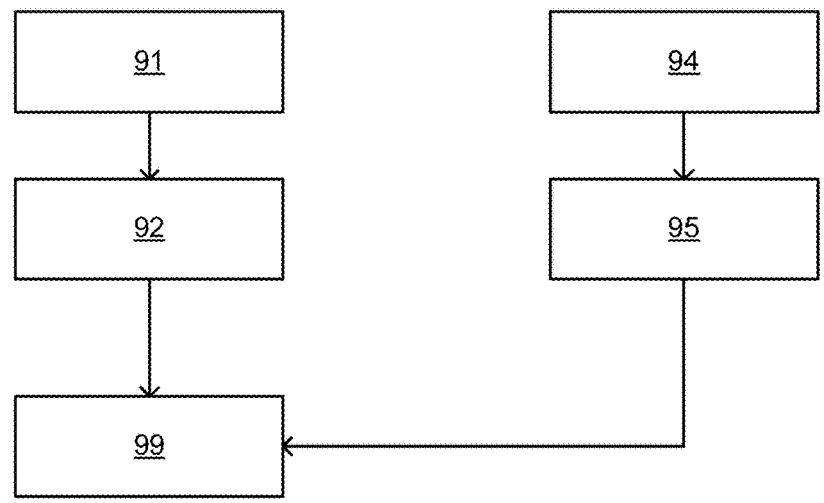
FIG. 6 illustrates a method.

FIG. 6 illustrates an example of method 90.

Method 90 may start by step 91 of illuminating, by an illumination unit, an area of a photo-sensitive polyimide layer with first ultraviolet radiation. There may be an object that is positioned on the photo-sensitive polyimide layer. The object may have microscopic dimensions (in the order of microns). The photo-sensitive polyimide layer may be positioned on a lower layer that may be a radiation reflecting layer. The lower layer may reflect ultraviolet radiation and/or white light.

Step 91 may be followed by step 92 of sensing, by a first sensor, a first reflected ultraviolet radiation that was reflected from the area.

Step 92 may be followed by step 99 of determining, by a processor, based at least in part on the first reflected ultraviolet radiation, the property of the object.

The property may include a position parameter (such as a height value) of the bottom of the object.

Method 90 may also include step 94 of illuminating the object with second radiation. The second radiation may be ultraviolet radiation (see, for example, second ultraviolet source 62' of FIG. 11) or may differ from ultraviolet radiation.

Step 94 may be followed by step 95 of sensing second reflected radiation that may be reflected from a part of the object that differs from a bottom of the object. The part may be the top of the object or a part that differs from the top and bottom of the object. For simplicity of explanation it may be assumed that the illuminated part of the top of the object.

Step 95 may be followed by step 99. When step 99 is preceded by step 95 then the determination may be based on the outcome of steps 93 and 95—the determining of the property of the object may be also based at least in part on the second reflected radiation.

By comparing (or subtracting) height values of the top of the object and of the bottom of the object—step 99 may provide an indication of the height of the object.

The wavelength of the first ultraviolet radiation may be below four hundred nanometers.

Figure 7:
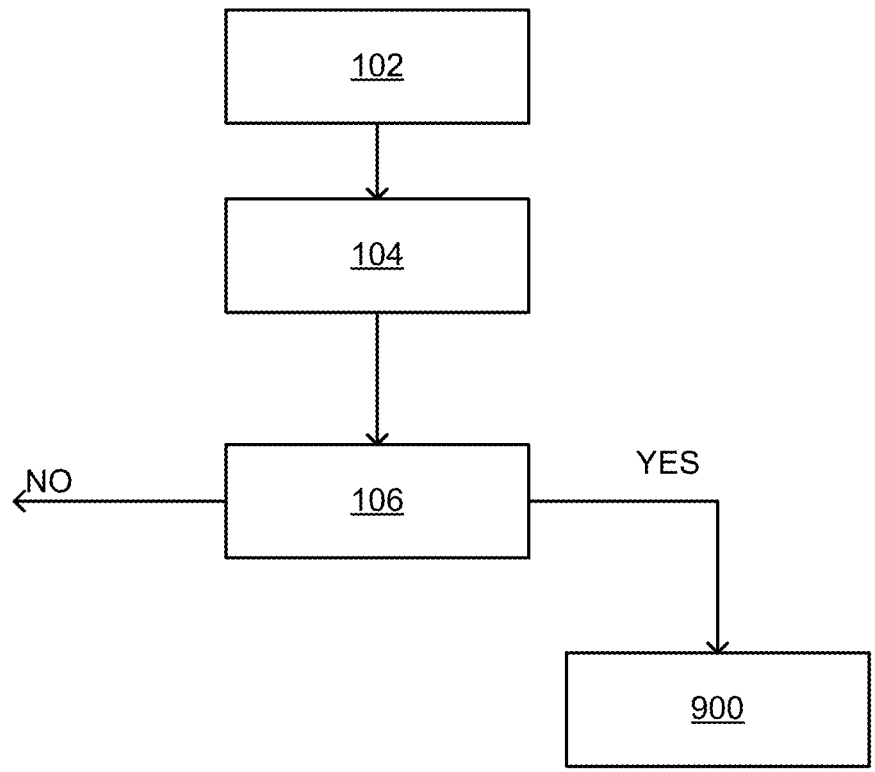
FIG. 7 illustrates a method.

FIG. 7 illustrates an example of method 100.

Method 100 may start by step 102 of illuminating an area with third radiation that differs from the first ultraviolet radiation. The area is an area of a photo-sensitive polyimide layer with first ultraviolet radiation. There may be an object that is positioned on the photo-sensitive polyimide layer. The object may have microscopic dimensions (in the order of microns). The photo-sensitive polyimide layer may be positioned on a lower layer that may be a radiation reflecting layer.

Step 102 may be followed by step 104 of collecting third reflected radiation from the area.

Step 104 may be followed by step 106 of determining whether to execute method 900 and (among other things) illuminate the area with the first ultraviolet radiation.

Only if determining to illuminate the area with the first ultraviolet radiation then jumping to execute method 900. Else—not executing method 900.

Step 106 may include determining to illuminate the area with the first ultraviolet radiation when the third reflected radiation exhibits an ambiguity. The ambiguity may be represented by having multiple reflections that may represents at least one faulty value.

Figure 8:
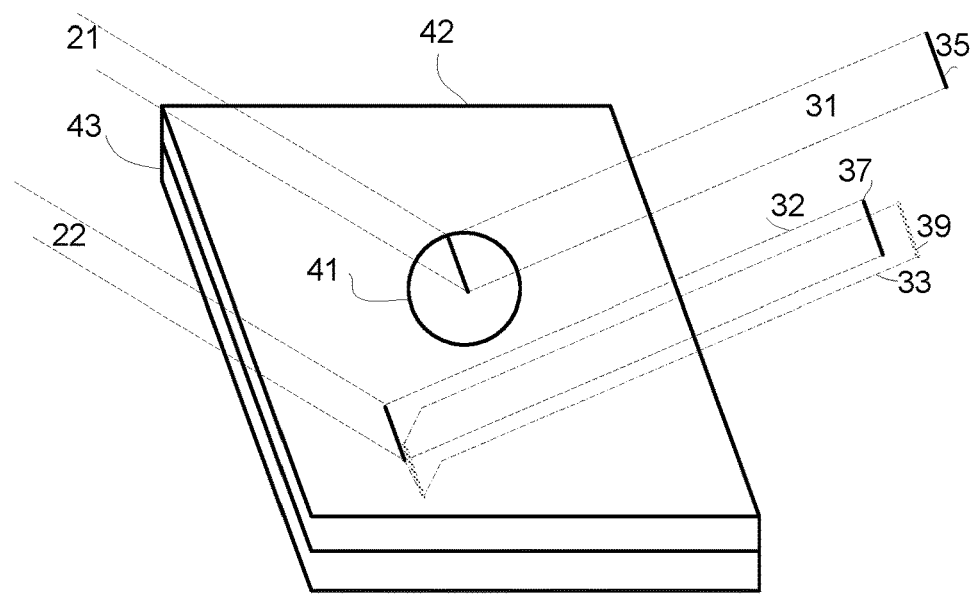
FIG. 8 illustrates an example of a height measurement.
Figure 9:
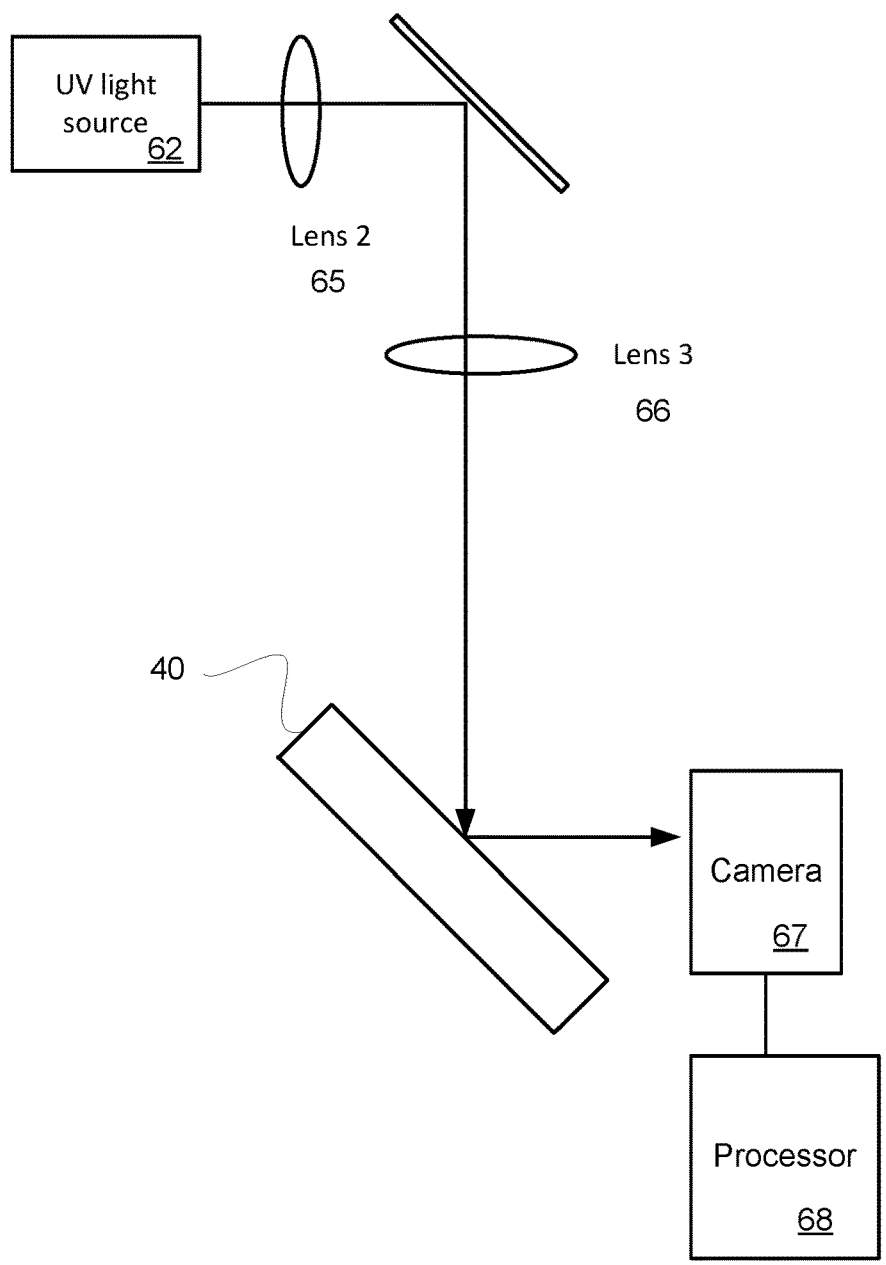

Referring to FIG. 8—a triangulation process may scan a bump 41 and a wafer that includes a PSPI layer 42 on top of a lower layer 43. The scanning is done by projecting a line of radiation.

Assuming white light radiation—FIG. 8 illustrates illuminating (at a first point of time) the top of the bump with radiation 21 to form a line of light on the top of the bump, where the reflected radiation 31 form a line of light 35 on the camera.

FIG. 8 also illustrates illuminating (at a second point of time) an area of the PSPI layer by radiation 22—forming a line of light on the upper surface of the PSPI layer—and first reflected radiation 32 forms a line of light 37 of the camera. Second reflected radiation 33 forms another line of light 39 on the camera. The camera should see only one line of light at a time—thus an ambiguity that merits the execution of method 900 exists. Method 900 may include illuminating at least the area of the PSPI layer with ultraviolet radiation and providing a single line (not shown). The height of the bump may be estimated by subtracting a height value associated with the area from the height value associated with the top of the bump.

The area of the PSPI layer may be of any shape and size but has to have a known spatial relationship with the object—for example of at the same height as the bottom of the object.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

I claim:

1. A method for determining a property of an object positioned on a photo-sensitive polyimide layer, wherein the photo-sensitive polyimide layer is positioned on a lower layer that is a radiation reflecting layer, the method comprises:
   illuminating an area of the photo-sensitive polyimide layer with third radiation that differs from a first ultraviolet radiation;
   collecting third reflected radiation from the area;
   determining whether to illuminate the area with the first ultraviolet radiation, based, at least in part, on the third reflected radiation;
   only when determining to illuminate the area with the first ultraviolet radiation then illuminating, by an illumination unit, the area with the first ultraviolet;
   sensing, by a first sensor, a first reflected ultraviolet radiation that was reflected from the area;
   illuminating the object with second radiation;
   sensing second reflected radiation that is reflected from a part of the object that differs from a bottom of the object;
   and
   determining, by a processor, based at least in part on the first reflected ultraviolet radiation and on the second reflected radiation, the property of the object.

2. The method according to claim 1 wherein the second reflected radiation is reflected from a top of the object, and wherein the property of the object is a height of the object.

3. The method according to claim 1 wherein the second radiation is a visible light radiation.

4. The method according to claim 1 wherein the second radiation is an ultraviolet radiation.

5. The method according to claim 1 wherein a wavelength of the first ultraviolet radiation is below four hundred nanometers.

6. The method according to claim 1 comprising determining to illuminate the area with the first ultraviolet radiation when the third reflected radiation exhibits an ambiguity.

7. The method according to claim 6 wherein the third radiation is a visible light radiation.

8. A method for determining a property of an object positioned on a photo-sensitive polyimide layer, wherein the photo-sensitive polyimide layer is positioned on a lower layer that is a radiation reflecting layer, the method comprises:
   illuminating, by an illumination unit, an area of the photo-sensitive polyimide layer with first ultraviolet radiation;
   sensing, by a first sensor, a first reflected ultraviolet radiation that was reflected from the area;
   illuminating the object with second radiation;
   sensing second reflected radiation that is reflected from a part of the object that differs from a bottom of the object;
   determining, by a processor, based at least in part on the first reflected ultraviolet radiation and on the second reflected radiation, the property of the object;
   wherein the illuminating of the area with the first ultraviolet radiation comprises:
   emitting the first ultraviolet radiation by an ultraviolet source;
   collecting the first ultraviolet radiation by an optical collector that is optically coupled to at least one optical fiber;
   conveying the first ultraviolet radiation over the at least one optical fiber and towards at least one optical element; and
   directing the first ultraviolet radiation onto the area by the at least one optical element; wherein at least one of the following is true: (a) the optical collector is a radially symmetrical and has a concave shape; (b) the optical collector is hollow; (c) the optical collector is a bulk of transparent coated with a reflective element, (d) the at least one optical fiber is a fiber bundle, and (e) the at least one optical fiber comprises a liquid core.

9. The method according to claim 8 wherein the optical collector is radially symmetrical and has the concave shape.

10. The method according to claim 8 wherein the optical collector is hollow.

11. The method according to claim 8 wherein the optical collector is the bulk of transparent coated with the reflective element.

12. The method according to claim 8 wherein the at least one optical fiber is the fiber bundle.

13. The method according to claim 8 wherein the at least one optical fiber comprises the liquid core.

14. An optical inspection system that comprises a first illumination unit, a first sensor and a processor;
   wherein the illumination unit is configured to illuminate an area of a photo-sensitive polyimide layer with first ultraviolet radiation; wherein an object is positioned on the photo-sensitive polyimide layer; wherein the photo-sensitive polyimide layer is positioned on a lower layer that is a radiation reflecting layer; wherein an illumination of the area comprises: emitting first ultraviolet radiation by an ultraviolet source; collecting the first ultraviolet radiation by an optical collector that is optically coupled to at least one optical fiber; conveying the first ultraviolet radiation over the at least one optical fiber and towards at least one optical element; and directing the first ultraviolet radiation onto the area by the at least one optical element; wherein at least one of the following is true: (a) the optical collector is a radially symmetrical and has a concave shape; (b) the optical collector is hollow; (c) the optical collector is a bulk of transparent coated with a reflective element, (d) the at least one optical fiber is a fiber bundle, and (e) the at least one optical fiber comprises a liquid core;
   wherein the first sensor is configured to sense a first reflected ultraviolet radiation that was reflected from the area;
   wherein the first illumination unit is configured to illuminate the object with second radiation; wherein the first sensor is configured to sense second reflected radiation that is reflected from a part of the object that differs from a bottom of the object; and
   wherein the processor is configured to determine, based at least in part on the first reflected ultraviolet radiation and on the second reflected radiation, a property of the object.

15. The automatic optical inspection system according to claim 14, comprising a second illumination unit and a second sensor; wherein the second illumination unit is configured to illuminate the object with second radiation;
   wherein the second sensor is configured to sense second reflected radiation that is reflected from a part of the object that differs from a bottom of the object; and
   wherein the processor is configured to determine the property of the object also in response to the second reflected radiation.

16. A non-transitory computer readable medium that stores instructions for:
   illuminating an area of a photo-sensitive polyimide layer with third radiation that differs from a first ultraviolet radiation;
   collecting third reflected radiation from the area;
   determining whether to illuminate the area with the first ultraviolet radiation, based, at least in part, on the third reflected radiation;
   only when determining to illuminate the area with the first ultraviolet radiation then illuminating, by an illumination unit, the area with the first ultraviolet radiation;
   wherein an object is positioned on the photo-sensitive polyimide layer, wherein the photo-sensitive polyimide layer is positioned on a lower layer that is a radiation reflecting layer;
   sensing, by a first sensor, a first reflected ultraviolet radiation that was reflected from the area;
   illuminating the object with second radiation;
   sensing second reflected radiation that is reflected from a part of the object that differs from a bottom of the object;
   and
   determining, by a processor, based at least in part on the first reflected ultraviolet radiation and on the second reflected radiation, the property of the object.

* * * * *